United States Patent
Greenwald et al.

(10) Patent No.: US 8,352,393 B2
(45) Date of Patent: Jan. 8, 2013

(54) METHOD AND SYSTEM FOR EVALUATING TESTS USED IN OPERATING SYSTEM FINGERPRINTING

(75) Inventors: Lloyd G. Greenwald, Murray Hill, NJ (US); Tavaris J. Thomas, Summit, NJ (US)

(73) Assignee: Alcatel Lucent, Paris (FR)

( * ) Notice: Subject to any disclaimer, the term of this patent is extended or adjusted under 35 U.S.C. 154(b) by 890 days.

(21) Appl. No.: 11/888,925

(22) Filed: Aug. 3, 2007

(65) Prior Publication Data

US 2009/0037353 A1    Feb. 5, 2009

(51) Int. Cl.
  *G06F 17/00*    (2006.01)
  *G06N 5/00*    (2006.01)
(52) U.S. Cl. ............................................. 706/45
(58) Field of Classification Search ............... 706/20, 706/45
See application file for complete search history.

(56) References Cited

U.S. PATENT DOCUMENTS

| | | | | |
|---|---|---|---|---|
| 6,101,275 | A * | 8/2000 | Coppersmith et al. | 382/226 |
| 2002/0129140 | A1* | 9/2002 | Peled et al. | 709/224 |
| 2004/0015728 | A1* | 1/2004 | Cole et al. | 713/201 |
| 2007/0297349 | A1* | 12/2007 | Arkin | 370/255 |

OTHER PUBLICATIONS

Arkin, Ofir, Fyodor Yarochkin, and Meder Kydyraliev. "The Present and Future of Xprobe2 The Next Generation of Active Operating System Fingerprinting" [Online] Downloaded Jul. 19, 2010. Jul. 2003 p. 1-35.*
Fedor V. Yarochkin et al., "Xprobe2++: Low Volume Remote Network Information Gathering Tool," IEEE/IFIP International Conference on Dependable Systems & Networks, Jun. 29, 2009-Jul. 2, 2009, pp. 205-210.

* cited by examiner

*Primary Examiner* — Ben Rifkin
(74) *Attorney, Agent, or Firm* — McCormick, Paulding & Huber, LLP

(57) ABSTRACT

In a system for evaluating classification systems such as an operating system (OS) fingerprinting tool (e.g., Nmap), information gain is used as a metric to evaluate the quality of the tool's classification tests, including fingerprinting tests and their associated probes. Information gain is determined using the OS fingerprinting tool's signature database rather than raw training samples, including taking into account signatures/data that are represented by ranges of test values, disjunctive values, and missing values. Uniform distributions over test values and classifications are assumed in applying these methods to an example signature database for Nmap. Other assumptions or a priori information (e.g., normal distributions over ranges) can also be accommodated. The information gain measure provided can be applied to other classification problems as well.

20 Claims, 5 Drawing Sheets

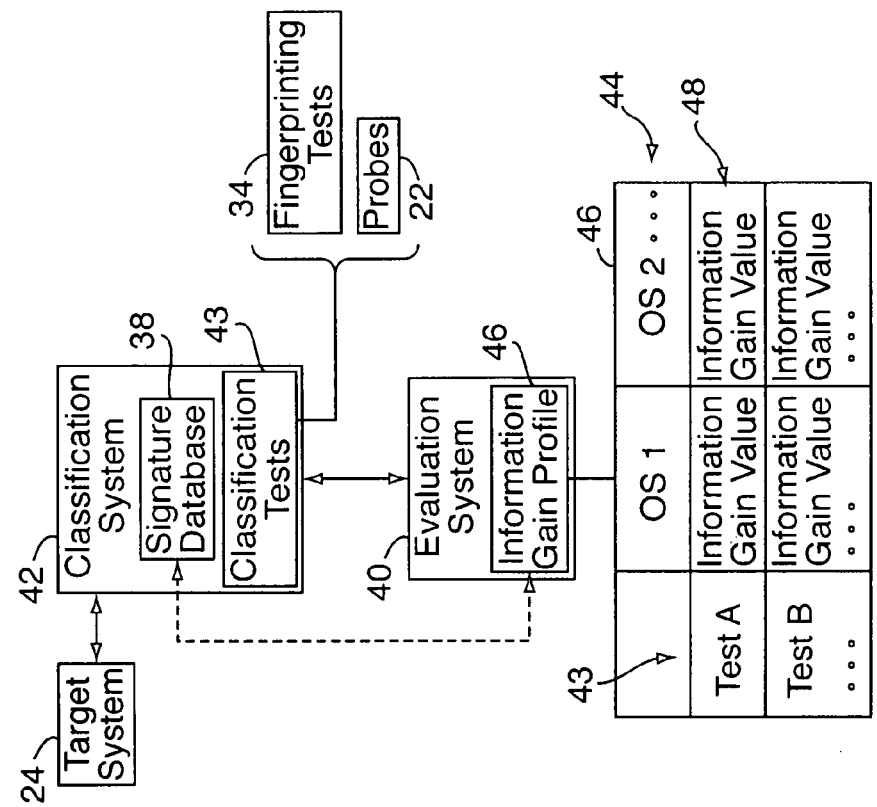

| | All (Entropy 8.70) | Windows (Entropy 5.36) | Linux (Entropy 6.39) | Routers/Firewalls/Switches (Entropy 6.71) |
|---|---|---|---|---|
| 1. | OPS (O2) 5.39 (>50%) | WIN (W6) 3.28 (>50%) | OPS (T3) 4.54 (>50%) | WIN (W2) 4.20 (>50%) |
| 2. | WIN (W2) 4.76 (>50%) | OPS (T3) 2.56 (>25%) | WIN (T3) 2.24 (>25%) | OPS (O2) 3.41 (>50%) |
| 3. | ISN (SP) 3.02 (>25%) | ISN (SP) 2.55 (>25%) | TS (SEQ) 1.88 (>25%) | ISN (SP) 3.08 (>25%) |
| 4. | TTL (T7) 2.77 (>25%) | IPID (TCP) 1.46 (>25%) | TTL (T7) 1.00 (>10%) | TTL (T6) 2.68 (>25%) |
| 5. | TS (SEQ) 2.67 (>25%) | TS (SEQ) 1.30 (>10%) | TOS (UDP) 0.71 (>10%) | TS (SEQ) 1.75 (>25%) |
| 6. | IPID (TCP) 1.62 (>10%) | TTL (T1) 1.24 (>10%) | F (T3) 0.68 (>10%) | F (T3) 1.70 (>25%) |
| 7. | F (T3) 1.61 (>10%) | IPL (UDP) 1.20 (>10%) | A (T3) 0.66 (>10%) | A (T7) 1.56 (>10%) |
| 8. | IPL (UDP) 1.55 (>10%) | Q (T3) 0.91 (>10%) | S (T3) 0.46 | DF (ICMP) 1.54 (>10%) |
| 9. | DF (ICMP) 1.54 (>10%) | A (T4) 0.80 (>10%) | ISN (SP) 0.46 | TOS (ICMP) 1.42 (>10%) |
| 10. | A (T7) 1.52 (>10%) | DF (T4) 0.65 (>10%) | DF (T7) 0.41 | RUCK(UDP) 1.38 (>10%) |
| 11. | TOS (ICMP) 1.28 (>10%) | F (T3) 0.48 | RD (T7) 0.41 | IPID (TCP) 1.32 (>10%) |
| 12. | TOS (UDP) 1.21 (>10%) | S (T4) 0.45 | R (T7) 0.41 | S (T7) 1.30 (>10%) |
| 13. | S (T3) 1.14 (>10%) | RD (T4) 0.38 | CC (ECN) 0.366 | RIPCK(UDP) 1.30 (>10%) |
| 14. | RUCK (UDP) 1.10 (>10%) | R (T4) 0.38 | RUCK (UDP) 0.19 | TOS (UDP) 1.16 (>10%) |
| 15. | RIPCK(UDP) 0.98 (>10%) | RUD (UDP) 0.17 | Q (T3) 0.19 | CD (ICMP) 1.00 (>10%) |
| 16. | RD (T2) 0.93 (>10%) | RID (UDP) 0.17 | IPID (ICMP) 0.16 | IPL (UDP) 0.98 (>10%) |
| 17. | CD (ICMP) 0.92 (>10%) | TOS (UDP) 0.17 | SI (ICMP) 0.16 | RID (UDP) 0.92 (>10%) |
| 18. | R (T2) 0.89 (>10%) | RIPL (0) | CD (ICMP) 0.16 | RD (T2) 0.92 (>10%) |
| 19. | RID (UDP) 0.70 | RIPCK (0) | DLI (ICMP) 0.16 | R (T2) 0.92 (>10%) |
| 20. | RIPL (UDP) 0.49 | CC (0) | RUD (UDP) 0.09 | RUD (UDP) 0.73 (>10%) |

FIG. 7

METHOD AND SYSTEM FOR EVALUATING TESTS USED IN OPERATING SYSTEM FINGERPRINTING

FIELD OF THE INVENTION

The present invention relates to testing and evaluation and, more particularly, to evaluation and testing of software systems.

BACKGROUND OF THE INVENTION

The transmission control protocol/Internet protocol suite (TCP/IP) is a commonly used communications protocol suite for the exchange of packet data in computer or other communication networks. Because of its widespread use, TCP/IP can form the basis for testing or evaluating disparate software systems, that is, it provides a common metric across different software systems that utilize TCP/IP for packet data communications. For example, operating system fingerprinting, also known as TCP/IP stack fingerprinting, is the process of determining the operating system of a target system (e.g., a system whose operating system is unknown) based on inferring properties of its TCP/IP protocol stack from observed packets. Due to ambiguities in TCP/IP specifications, there are many variations in TCP/IP implementations. Ambiguous specifications permit some degree of flexibility in optimizing protocol implementations, setting initial parameters, or including or excluding certain options. In addition to subtle implementation differences, TCP/IP implementations may have bugs or fail to correctly capture a specification. Additionally, operating system designers may choose from a number of compatible but varying versions of TCP, such as "Reno" or "Tahoe." Implementation variations, errors, and version choices can be used to fingerprint operating systems, that is, to identify or otherwise classify an unknown operating system from its TCP/IP characteristics.

There are many reasons to fingerprint an operating system. For example, fingerprinting may be used defensively as an internal auditing tool or as an external vulnerability assessment tool. Other reasons include tailoring offensive exploits, detecting unauthorized devices in a network, and gathering statistics for tracking operating system deployment trends.

Fingerprinting can be active or passive. As shown in FIG. 1, for active fingerprinting, an operating system (OS) fingerprinting tool or system 20 sends specifically crafted network packets ("probes") 22 to a target system 24 and records the packets 26 that are returned in response, if any. As indicated, the target system 24 includes an unknown operating system 28 with a TCP/IP protocol stack 30, and communications are carried out across a network 32. Passive fingerprinting listens for packets generated by a host based on communications with other sources and records these packets. In either case, fingerprinting tests 34 are applied to the content of the recorded packets 26 to help classify the software 28, 30 that produced the packets 26. To classify the operating system 28 of a target system 24, the results 36 of the classification tests 34 are compared to results from known systems. The results from known systems are stored in signature databases 38. Tools for active fingerprinting include "Nmap," "synscan," and "Xprobe2." Tools for passive fingerprinting include "p0f" and "SinFP."

Fingerprinting tools 20 offer a variety of probes and tests 22, 34. The default approach to classifying the operating system 28 of a target system 24 using these tools is to send all the probes 22, perform all the tests 34 on the response packets 26, and record the results 36 for use in classification. However, each probe 22 and test 34 incurs a cost, e.g., time spent sending the probe and waiting for the response, and processing time for executing the test. These costs motivate the need to select only those probes and tests that contribute enough to classifying the unknown operating system 28 to justify the cost.

SUMMARY OF THE INVENTION

An embodiment of the present invention relates to a system and method for evaluating a classification system, e.g., for evaluating software tools such as an operating system (OS) fingerprinting tool. The classification system includes a signature database for use in classifying target systems. By "target" system, it is meant a system with one or more unknown characteristics, which are to be classified, identified, and/or analyzed by the classification system. "Signature database" refers to a collection of rules for classifying data objects, which are provided in a summary or digested form. For example, the signature database may include data, electronic or otherwise, summarizing or otherwise relating to the application of various classification tests to one or more known systems, that is, systems with known characteristics of interest. In operation, the evaluation system determines an information gain profile of the classification system's signature database. The classification system is then evaluated based on the information gain profile. By "information gain profile," it is meant one or more information gain characteristics (e.g., calculated information gain values) of the classification system, e.g., that quantify the value or benefit in using the classification system's various classification tests, versus not using the classification tests, to classify a target system.

In the case of evaluating OS fingerprinting tools, the evaluation system of the present invention uses information gain as a metric to evaluate the quality of the tools' fingerprinting tests and associated probes. (Fingerprinting test and probes are referred to herein generally collectively as "classification tests.") In other systems where information gain is utilized, information gain is computed from collections of training samples of tests from known systems. However, fingerprinting tools store information about known systems in digested signature databases rather than as raw training samples. This removes and obscures distribution information that is present in representative training samples. Here, the evaluation system computes information gain using signature databases, including the information gain of signatures/data represented by ranges of test values (rather than a single value), missing or null values, and disjunctive values. As indicated above, a signature database can be viewed as a collection of rules for classifying data objects. The information gain measure utilized herein can be applied to any classification problem whose data is summarized with a similar collection of classification rules.

Typically, the information gain profile of an OS fingerprinting tool will include a plurality of information gain values, with one or more information gain values for each of the OS fingerprinting tool's classification tests. Once the information gain values are determined, the OS fingerprinting tool is evaluated, in one embodiment of the present invention, by ranking the information gain values of the classification tests. For example, the information gain values can be ranked in numerical order, with higher information gain values indicating that the classification tests associated therewith are more valuable for use in identifying target operating systems. The ranking may also be a function of a particular operating system or family of operating systems, such as grouping the classification tests as a function of their discriminative value in identifying between different operating systems and families/groups of operating systems. Once the OS fingerprinting tool is evaluated in this manner, classification tests with higher information gain values may be carried out for identifying a target system, while those with lower information gain values may be omitted. Classification tests may also be carried out in an order based on a decision tree analysis.

BRIEF DESCRIPTION OF THE DRAWINGS

The present invention will be better understood from reading the following description of non-limiting embodiments, with reference to the attached drawings, wherein below:

FIG. 3 is a schematic diagram of a system for evaluating OS fingerprinting tools, according to an embodiment of the present invention;

FIG. 4 is a table showing a collection of pre-classified training samples;

FIG. 5 is a table showing an example signature database;

FIG. 7 is a table showing an information gain profile for Nmap 2nd generation classification tests;

DETAILED DESCRIPTION

Figure 1:
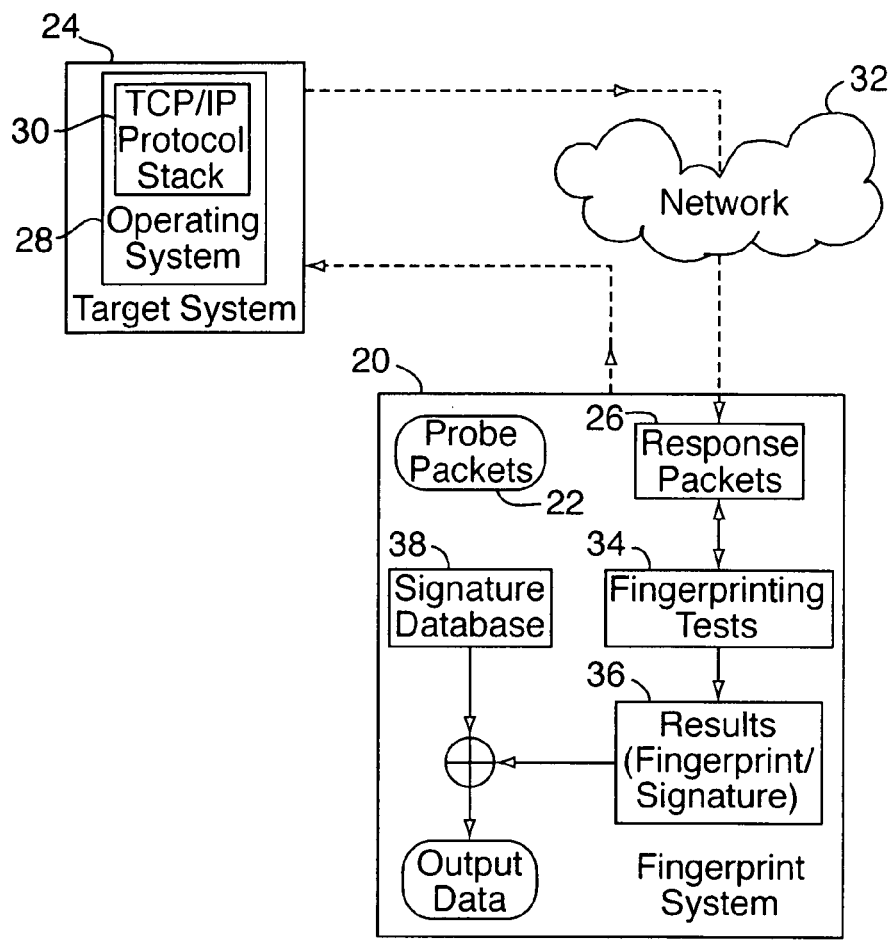
FIG. 1 is a schematic diagram of an operating system (OS) fingerprinting tool in use for classifying a target system.

With reference to FIGS. 1-9C, an embodiment of the present invention relates to a system and method 40 for evaluating a classification system 42, e.g., for evaluating software tools such as an operating system (OS) fingerprinting tool 20. The classification system 42 includes a signature database 38 for use in classifying target systems 24. As noted above, by "target" system, it is meant a system with one or more unknown characteristics, which are to be classified, identified, and/or analyzed by the classification system 42. "Signature database" refers to a collection of rules for classifying data objects, which are provided in a summary or digested form. For example, the signature database may include data, electronic or otherwise, summarizing or otherwise relating to the application of various classification tests 43 to one or more known systems 44 (see FIG. 2), that is, systems with known characteristics of interest. In operation, the evaluation system 40 determines an information gain profile 46 of the classification system's signature database 38. The classification system 42 is then evaluated based on the information gain profile 46. By "information gain profile," it is meant one or more information gain characteristics (e.g., calculated information gain values 48) of the classification system, e.g., that quantify the value or benefit in using the classification system's various classification tests 43 for classifying a target system 24.

The information gain profile 46 of an OS fingerprinting tool 20 includes a plurality of information gain values 48, with one or more information gain values for each of the OS fingerprinting tool's classification tests 43. Once the information gain values 48 are determined, the OS fingerprinting tool 20 is evaluated based on the information gain values. For example, the information gain values may be ranked in numerical order, and/or as a function of a particular operating system, family of operating systems, or other known systems 44. Once the OS fingerprinting tool is evaluated in this manner, the classification tests with higher information gain values may be carried out for identifying a target system 24, while those with lower information gain values may be omitted. Classification tests may also be carried out in an order based on a decision tree analysis. The information gain profile may be used for other evaluation purposes, such as building better fingerprinting tools, focusing efforts in the design of defensive devices to defeat fingerprinting, and providing insight into how to build more secure TCP/IP implementations.

As should be appreciated, the evaluation system 40 uses information gain as a metric to evaluate the quality of OS fingerprinting tools/systems 20 and their associated classification tests 43, e.g., tests 34 and probe packets 22. Information gain is generally computed from collections of training samples of tests from known systems. However, fingerprinting tools store information about known systems in digested signature databases rather than as raw training samples. This removes and obscures distribution information that is present in representative training samples. Despite this, the system 40 is configured to compute information gain using signature databases, including taking into consideration signature data represented by ranges of test values, disjunctive values, and missing values.

Turning now to a more detailed discussion of OS fingerprinting tools generally, there are many tools available for both active and passive operating system fingerprinting. The second generation operating system fingerprinting in Nmap encompasses many of the techniques used in these tools, including probes and tests based on TCP, UDP, and ICMP packets and tests on IP headers. As such, operation of the evaluation system 40 is described herein with respect to use with Nmap, as a pertinent example.

Nmap sends a total of sixteen probes 22 to a target system 24 and applies a series of tests 34 to the probe responses 26. The test values are combined into a fingerprint 36, also known as a signature. The fingerprint 36 of a target system is compared against reference fingerprints in a signature database 38 in order to find matches to help classify the operating system 28 of the target system 24. Tests are organized into categories within a fingerprint. Nmap first sends six TCP SYN packets in distinct time intervals to an open port on the target machine. These probes vary only in TCP options and TCP window fields. The test values computed from the response packets are organized into the categories SEQ, OPS, WIN, and T1. The remaining ten probes include three more TCP packets to open ports (T2-T4), three TCP packets to closed ports (T5-T7), a TCP packet to an open port with the Explicit Congestion Notification (ECN) control flags set, two ICMP ECHO packets (IE), and one UDP packet sent to a closed port to elicit an ICMP port unreachable packet. Probes T2-T7 vary in flags and fields of the TCP header. In addition to tests on the headers of returned TCP and ICMP packets, IP headers are tested in the responses to the initial six TCP SYN probes as well as the three ICMP responses.

Within the SEQ category are tests on the initial sequence number (ISN) generation algorithm of a TCP implementation. These tests include the sequence predictability index (SP), which measures the variability between the sequence numbers contained in the responses to the first six TCP SYN probes. Sequence numbers that increase in fixed increments (or stay constant) are easy to predict while other schemes are more unpredictable. If an operating system has a predictable ISN generation algorithm, it is vulnerable to malicious activity such as TCP connection hijacking. The timing between consecutive probes of the first six TCP SYN probes is also used to test the TCP timestamp generation option (TS). Additionally, these six probes are used to test the IP header ID value to infer properties of the IPID generation algorithm.

Nmap tests the window size field on the packets 26 returned in response to all TCP probes. Tests on the responses of the first six probes are grouped into the WIN category and the remaining tests are reported in the T2-T7 categories. The different TCP options and window sizes sent in these twelve probes can cause a target system to change the window size value in its response packet. The window size field is used for flow control and is set differently based on operating system implementation and in response to TCP options settings. Similarly, each returned TCP packet is tested for the value of its TCP options. Tests on the responses to the first six probes are grouped into the OPS category, and the remaining tests are reported in the T2-T7 categories. Since TCP options fields are optional, many TCP/IP implementations differ in how they handle them, and these differences can be useful in fingerprinting. Some TCP/IP stack implementations do not implement any of the options in the SYN packet. Other operating systems will respond with some or all of the options that were sent originally, or they may even include additional options such as padding (NOP).

Nmap calculates the target system's initial time-to-live (TTL) value based on an ICMP port unreachable packet returned in response to a UDP packet sent to a closed port. The TTL field is set to a value that represents the maximum time the packet is allowed to traverse the Internet before being dropped, and is decremented at each router. The returned ICMP packet includes both a decremented TTL value in its IP header and a decremented TTL of the sent IP packet within the ICMP response. This information is used to calculate the target system's initial TTL value. If the ICMP packet gets blocked, Nmap can guess the target system's initial TTL value from a decremented TTL in other packets. The different values used for the initial TTL field are useful in fingerprinting.

Turning now to a more detailed discussion of how information gain is used as a metric for evaluating fingerprinting tests 43, the evaluation system 40, in a general sense, compares how accurately the classification system 42 in question could classify a target system 24 before and after performing the test 43 in question. The difference is called the information gain. The test 43 with the highest information gain provides the most discriminative power in fingerprinting the target system 24. Information gain is built on the mathematical principles of information theory, and is an important tool in building decision tree classifiers. Information gain is used to select the next test at each step in growing a decision tree.

Information gain is not a perfect measure of test quality. One well-known weakness is that information gain tends to overestimate the quality of tests that have many possible values. The impact of this weakness in the analysis of fingerprinting tests is discussed below. Alternatives to information gain that are less biased toward multi-valued tests, but retain other weaknesses, include gain ratio and minimum description length.

Algorithms for calculating information gain commonly assume a collection of pre-classified training samples, such as that depicted in the table in FIG. 4. These training samples are assumed to be representative of domain objects, both in distribution of class labels and in distribution of test values for each test across objects. These assumptions are used to derive the probability distributions needed to calculate information gain. In operating system fingerprinting, this would correspond to having a collection of samples of target systems that include the operating system label of the target system and the values of all fingerprinting tests applied to that target system. The collection of samples would be representative of target systems both in terms of the distribution of labels in the collection and the distribution of test values for each operating system. The same operating system may have different values for a given test on different systems based on factors such as drivers and user options.

Figure 2:
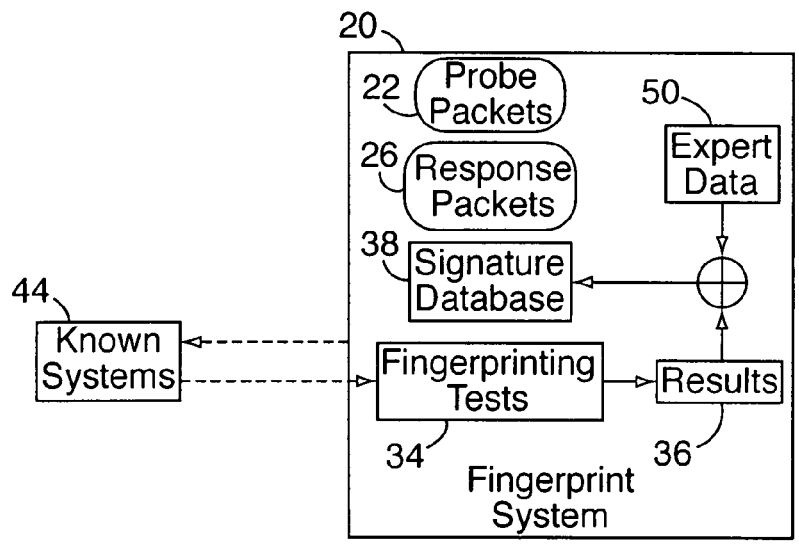
FIG. 2 is a schematic diagram of the development of a signature database portion of the fingerprinting tool.

One aspect of applying information gain as a metric in evaluating fingerprinting tests is generating such a collection of training samples. With reference to FIG. 2, it is observed that open source fingerprinting tools 20 such as Nmap take advantage of their large communities of users to solicit training samples 26 representative of the variety of fielded systems 44. These training samples 26 are collected under controlled conditions and submitted to the open source tool maintainers. The open source tool maintainers then use the training samples to create a signature database 38 to be used in fingerprinting. A signature database in this instance is a list of known systems (e.g., known operating systems) and the corresponding known test values for these systems, generated as combination of training data 36 and expert knowledge/data 50. Expert knowledge 50 is employed to tailor a database entry to capture the possible variations in test values for an operating system, both based on sampled systems and knowledge of the operating system itself.

The table in FIG. 5 depicts an example signature database 38 with eight classifications and three tests. Each classification describes the test values that are valid for that classification. For some tests (e.g., Test 1) each classification specifies a single, discrete test value. For some tests (e.g., Test 2) each classification specifies a disjunctive list of discrete test values. For some tests (e.g., Test 3) each classification specifies a range of test values. A classification might combine disjunctive lists and ranges, and may also specify no value for a given test. The classification entry in the first row of the table in FIG. 5 specifies that a remote device can be classified as having "OS 1" if Test 1 takes on value "a," Test 2 takes on values "a" or "b," and Test 3 takes on any value in the range of 1-5.

In the evaluation system 40, a signature database 38 is treated as the source of data for calculating information gain 46. Since a signature database is once removed from the training samples used to create the database, calculations are derived to take advantage of the knowledge represented in the signature database. This includes making assumptions about the knowledge that has been lost in the process of converting representative training samples into a database, and making use of data that is represented as disjunctive lists, ranges of values, and/or as null or missing values.

In machine learning problems, the existence of a test with no corresponding value for a training sample might indicate noise in testing. The assumption is that the training sample should have a value for that test, drawn from the domain of values for that test. However, in the system 40, the absence of a value for a test in a signature database is assumed to be intentional. It indicates that the entry should not match any of the values that the test produces, for example, the value "OS 8" takes on for test 2 in FIG. 5. Under this assumption, a missing test value is treated as a unique test value (e.g., none) in calculating information gain.

The following outlines the calculation of information gain using signature databases as data, including the handling of disjunctive lists and ranges of values. Let X be a random variable that describes the classification of the operating system of a target system. Let X take on n possible values, each with an a prior probability $p(x_j)$, $1 \leq j \leq n$. The entropy in X is the amount of uncertainty there is in classifying an unknown system. This can also be referred to as the information content of knowing the correct classification. It can be expressed as:

$$H(X) = -\sum_{j=1}^{n} p(x_j) \log_2 p(x_j)$$

Let $Test_i$ be a random variable that describes the result of applying test i to the probe responses of a target system. Let $Test_i$ take on $n_i$ values, each with probability $p(test_{ik})$, $1 \leq k \leq n_i$. Knowing the value of $Test_i$ may convey something about the value of X. This can be captured in the conditional entropy of X given $Test_i$. Conditional entropy can be expressed as:

$$H(X \mid Test_i) = -\sum_{k=1}^{n_i} p(test_{ik}) \sum_{j=1}^{n} p(x_j \mid test_{ik}) \log_2 p(x_j \mid test_{ik})$$

A measure of the amount of information gained about X if the value $Test_i$ is known is called the mutual information, or information gain, of X and $Test_i$. This can be expressed as:

$$H(X; Test_i) = H(X) - H(X \mid Test_i)$$

The fingerprinting test that conveys the most about the operating system classification of a target system is the one that removes the most uncertainty about the classification, namely the test with the highest information gain.

To calculate information gain, the following are utilized: the probability of each classification, $p(x_j)$, $1 \leq j \leq n$; the probability of each test value, $p(test_{ik})$, $1 \leq k \leq n_i$, for test $Test_i$; and the conditional probability of each classification with respect to each test value, $p(x_j \mid test_{ik})$, $1 \leq j \leq n$ and $1 \leq k \leq n_i$. Given a collection of training samples and the assumption that the data are representative of the frequency with which classifications and test values occur in practice, these probabilities can be calculated directly. However, it is assumed herein that the system 40 has access to a signature database rather than a collection of training samples. Signature databases remove much of the information about distributions over classifications and distributions over test values that are represented in sets of training samples. To make up for this lost information, $p(test_{ik})$ and $p(x_j \mid test_{ik})$ are re-expressed in terms of $p(x_j)$ and $p(test_{ik} \mid x_j)$. These latter quantities are more easily measured from a signature database or other sources.

Through a combination of marginalization and the product rule, the following is obtained:

$$p(test_{ik}) = \sum_{j=1}^{n} p(x_j) * p(test_{ik} \mid x_j)$$

Thus, the probability of each test value is calculated by summing, over all classifications (entries in the signature database), the multiplication of probability of that classification times the probability of the test value given the classification. Making use of Bayes rule, the probability of a classification given a specific test value, $p(x_j \mid test_{ik})$, can be expressed as the following ratio:

$$p(x_j \mid test_{ik}) = \frac{p(x_j) * p(test_{ik} \mid x_j)}{\sum_{j=1}^{n} p(x_j) * p(test_{ik} \mid x_j)}$$

These equations allow for the calculation of information gain as long as the distribution over classifications $p(x_j)$ and distributions over test values, given a known classification $p(test_{ik} \mid x_j)$, are known. There is not enough information in a signature database to tell anything directly about $p(x_j)$. However, it is possible to make use of information in a signature database to calculate $p(test_{ik} \mid x_j)$. To do so, the four types of database entries indicated in the table in FIG. 5 are taken into account: (1) tests that match a single discrete value; (2) tests that match one of a disjunctive set of values; (3) tests that match one of a range of values; and (4) tests that match a disjunctive set of discrete values or ranges (not shown).

Figure 6A:
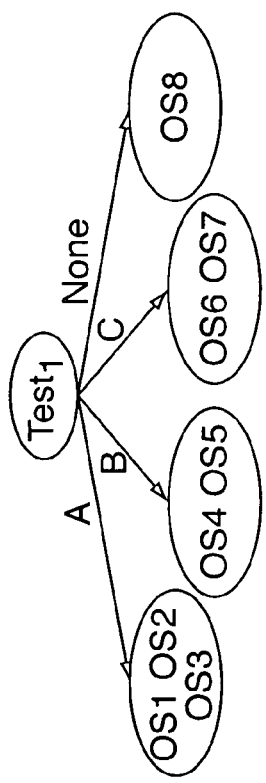
FIGS. 6A and 6B are graphs illustrating a relationship between tests and signature database entries.
Figure 6B:
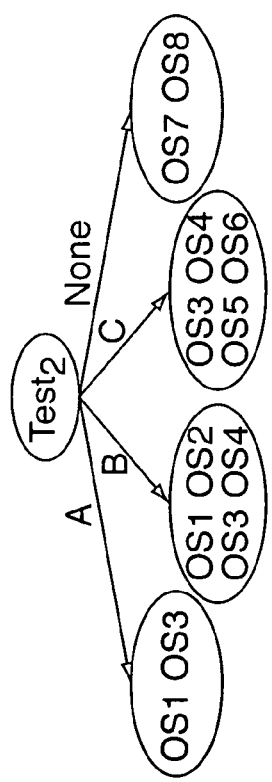

To understand the differences between case 1 and cases 2-4 (disjunctions and ranges), the relationship between tests and signature database entries are depicted as in FIGS. 6A and 6B. Prior to fingerprinting a target system, the operating system can be guessed based on the a priori distribution of operating system classifications, $p(x_j)$, over all possible classifications. After performing a fingerprinting test, the operating system can be guessed based on the a posteriori distribution of operating system classifications, $p(x_j \mid test_{ik})$. This a posteriori distribution is conditioned on the test result. FIG. 6A shows that, for tests with a single discrete value per operating system, the tests partition the database into mutually exclusive sets. $p(x_j \mid test_{ik})$ can then be computed by just considering the set in which $x_j$ falls. FIG. 6B shows that, when considering tests with disjunctions or ranges of values, the resulting sets are not mutually exclusive. Each classification may contribute to the probability of more than one test value per test. Each set that a classification can be in is considered (i.e., each value it takes on), and then the probability of each set is combined in order to derive $p(x_j \mid test_{ik})$.

Firstly considered is the case in which a test has one discrete value, $test_{ik}$, per classification, $x_j$. In this case, $p(test_{ik} \mid x_j)=1$ for that value and $p(test_{ik} \mid x_i)=0$ for all others. This case is represented by Test 1 in FIGS. 5 and 6A.

The remaining three cases require information about distributions over test values given a classification. If this information is indicated in the signature database, it can be used here. Without that information, it is assumed that each test value specified in a classification is equally likely. Other assumptions or a priori information about test value distributions (e.g., normal distributions over ranges) can be accommodated as well.

Let $size_{ij}$ the number of values that $Test_i$ can take on in classification entry $x_j$. If $Test_i$ is disjunctive, this is the sum of discrete values. If $Test_i$ is a range, this is the size of the range. If $Test_i$ is a combination of disjunctive values and ranges, this is the sum of sizes of each disjunct. If it is assumed that each test value is equally likely, then $p(test_{ik} \mid x_j)=1/size_{ij}$ for each test value $test_{ik}$ that occurs in the classification entry for classification $x_j$ and zero for all other test values. This results in:

$$p(test_{ik}) = \sum_{x_j \text{ includes } test_{ik}} p(x_j) * \frac{1}{size_{ij}}$$

One way to interpret this is that each classification contributes a fractional value to the total probability of each test value, weighted by the probability of the classification and the probability of the value within the classification. Note that this subsumes the first case, where $1/size_{ij}=1$ for each test value $test_{ik}$ that occurs in the classification entry for classification $x_j$ and zero for all other test values. This results in $p(x_j|test_{ik})=0$ for each value $test_{ik}$ that is not included in $x_j$, and for each value $test_{ik}$ that is included in $x_j$:

$$p(x_j \mid test_{ik}) = \frac{\frac{p(x_j)}{size_{ij}}}{\sum_{x_j \text{ includes } test_{ik}} \frac{p(x_j)}{size_{ij}}}$$

Recall that there is not enough information in a signature database to convey anything directly about $p(x_j)$. If it is assumed that all classifications $x_j$ are equally likely, this results in $p(x_j|test_{ik})=0$ for each value $test_{ik}$ that is not included in $x_j$, and for each value $test_{ik}$ that is included in $x_j$:

$$p(x_j \mid test_{ik}) = \frac{\frac{1}{size_{ij}}}{\sum_{x_j \text{ includes } test_{ik}} \frac{1}{size_{ij}}}$$

Let $sumsize_{ik}^{-1} = \sum_{x_j \text{ includes } test_{ik}} size_{ij}^{-1}$.

For uniformly distributed classifications and uniformly distributed test values per classification, conditional entropy can be expressed as:

$$H(X \mid Test_i) = -\frac{1}{n}\sum_{k=1}^{n_1} sumsize_{ik}^{-1} \sum_{j=1}^{n} \frac{size_{ij}^{-1}}{sumsize_{ik}^{-1}} \log_2 \frac{size_{ij}^{-1}}{sumsize_{ik}^{-1}}$$

Information gain may then be calculated from a signature database, assuming uniformly distributed classifications and uniformly distributed test values per classification, as follows:

$$H(X; Test_i) = \log_2 n + \frac{1}{n}\sum_{k=1}^{n_1} sumsize_{ik}^{-1} \sum_{j=1}^{n} \frac{size_{ij}^{-1}}{sumsize_{ik}^{-1}} \log_2 \frac{size_{ij}^{-1}}{sumsize_{ik}^{-1}}$$

Given the calculation for information gain derived above, the quality of classification tests (e.g., fingerprinting tests and associated probes) can be evaluated for any fingerprinting tool that includes a signature database. As a demonstration of the use of this measure, the tests and probes of the Nmap fingerprinting system are analyzed herein. The tests from the second generation of Nmap operating system detection are focused on primarily, with some discussion of first generation tests and an analysis of the probes associated with those tests. Finally, it is discussed how information gain as a quality measure relates to the effectiveness of fingerprinting in practice.

In the following analysis of Nmap fingerprinting tests, it is assumed that a target system 24 is equally likely to be any entry in the signature database 38 (or any entry from a family of selected entries from the database). It is further assumed that all possible values of a test for a given classification (e.g., from disjunctions or ranges) are also equally likely. Despite the fact that these assumptions are weak, interesting insight is gained into the quality of Nmap's fingerprinting tests. The calculations derived above are straightforward to apply to different assumptions of a priori distribution information. This section is intended as an example of applying the evaluation method of the present invention, rather than a conclusive study of the quality of Nmap fingerprinting tests.

Operating system fingerprinting can be studied both as a tool and as something to defend against. Fingerprinting tests with high information gain eliminate a significant degree of uncertainty about the target system and may be used to build effective fingerprinting tools, depending on the costs of the tests. Therefore, these are the tests that defensive device designers should pay the most attention to in order to increase their cost of application. Fingerprinting tests with low information gain leave a lot of uncertainty about the target system and are only worthwhile if higher quality tests are too costly. Even so, they are unlikely to be useful independently. Fingerprinting tests can be used in sequence in order to gain increasingly more information about a target system. This is the basis for building decision trees for classification, which is touched upon herein in discussing the information gain of fingerprinting tests with respect to a family of selected entries from a database.

As an example of ranking classification tests by information gain, the results of applying an information gain calculation to Nmap version 4.21ALPHA4 second generation fingerprinting tests are provided in the table in FIG. 7. The left-most column captures information gain calculated over all the entries in the signature database. The remaining three columns capture information gain for subsets of entries in the signature database, corresponding respectively to general-purpose computers running versions of Microsoft Windows, general-purpose computers running versions of Linux, and embedded devices identified as routers, firewalls, or switches. Each column indicates the total entropy of the collection of entries prior to applying any tests and the list of the top 20 fingerprinting tests, ranked according to the information gain of each test. There are 417 entries in the Nmap version 4.21ALPHA4 second generation signature database. Of these 417 entries, pulled out were 41 entries corresponding to Microsoft Windows, 84 entries corresponding to Linux, and 105 entries corresponding to routers, firewalls, and switches.

Nmap tests the same TCP/IP feature multiple times using slightly different probes. For example, Nmap looks at the options field of the TCP header returned from 13 of its probes. In the table in FIG. 7, only the maximum information gain of each type of test is recorded, along with specifying the probe which solicited the maximum information gain. This confers an understanding of the best possible quality of each type of test. Discussed below is the variety of responses for each type of test across probes. FIG. 7 labels tests based on how much uncertainty they remove. Tests are labeled as either removing at least 50%, 25%, 10%, or less than 10% of the uncertainty.

Figure 8A:
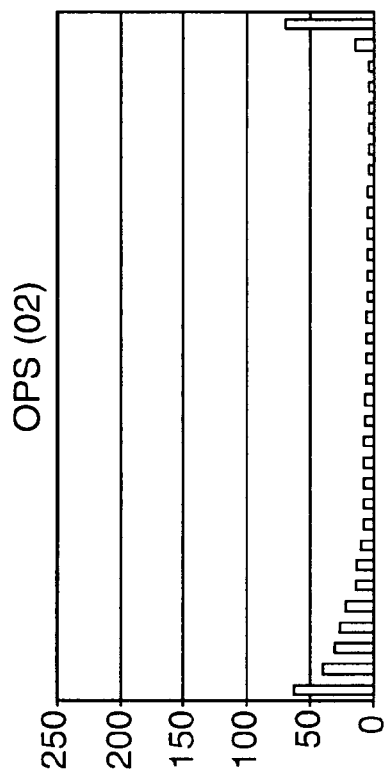
FIGS. 8A and 8B are graphs showing distributions of values for Nmap fingerprinting tests that remove >50% of uncertainty in identifying a target system.
Figure 8B:
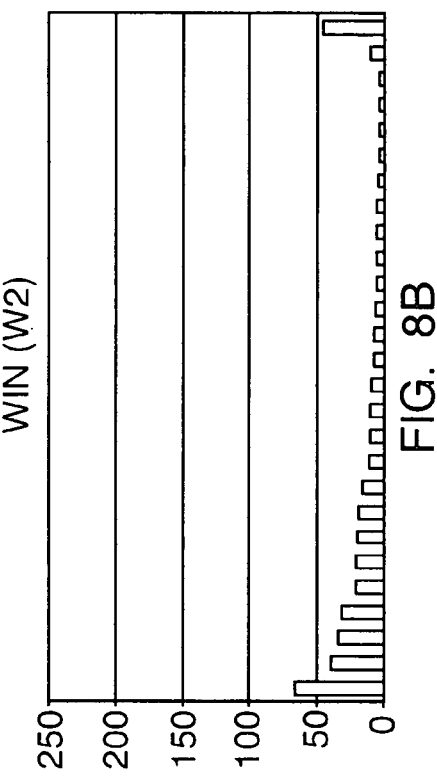

From FIG. 7 it can be seen that the tests on TCP options and TCP initial window size coming from the second sequence generation probe remove the most uncertainty from the operating system fingerprinting problem over all database entries. These are the only two tests that remove at least 50% of the uncertainty. FIGS. 8A and 8B further explore these highly discriminative fingerprinting tests by depicting the distribution of values for each test over all signature database entries. The TCP options test elicits 115 different values, of which 85 narrow down the selection to one or two operating systems (these are grouped in the rightmost values to more compactly depict the tail of the distribution). The TCP initial window size test elicits 80 different values, of which 55 narrow down the selection to one or two operating systems. These are the most discriminative fingerprinting tests.

Figure 9A:
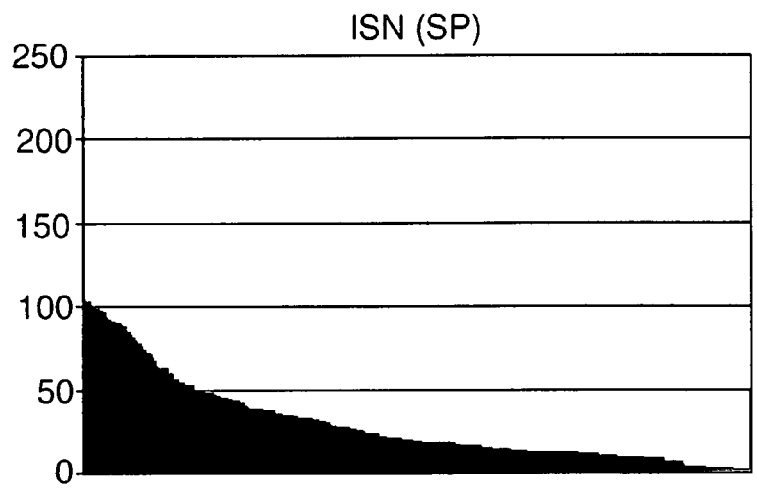
FIGS. 9A-9C are graphs showing distributions of values for Nmap fingerprinting tests that remove >25% of uncertainty in identifying a target system.
Figure 9B:
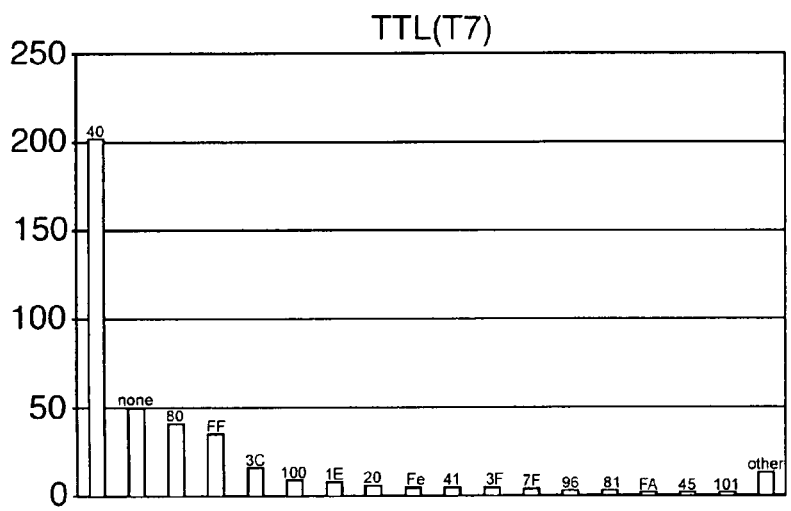
Figure 9C:
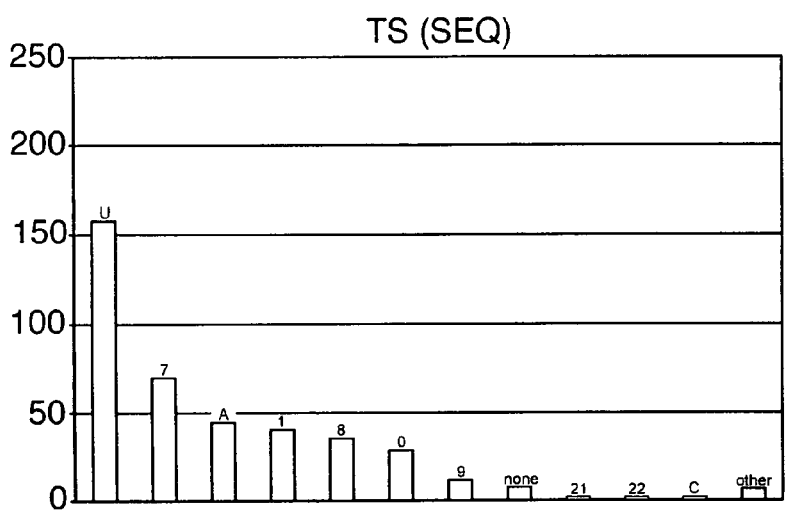

The second tier of discriminative tests include TCP initial sequence number (ISN) predictability index (SP), using the six sequence generation probes, the IP initial time-to-live field from TCP probe T7, and the TCP timestamp option rate of timestamp increments per second using the six sequence generation probes. Each of these tests removes greater than 25% of the uncertainty in selecting an operating system from all the entries in the signature database. FIGS. 9A-9C further explore these discriminative fingerprinting tests by depicting the distribution of values for each test over all signature database entries. The ISN (SP) test has about 350 values of which only 50 narrow down the selection to one or two operating systems. The test is more likely to achieve one of the remaining 300 values, after which more testing will be required to reduce uncertainty beyond 25% and guess an operating system classification with confidence. The TTL test has about 28 of which 15 narrow down the selection to one or two operating systems. The TS test has about 17 values of which 9 narrow down the selection to one or two operating systems. In both the TTL and TS tests the most likely test value leaves much more testing to narrow down the operating system classification. For example, the most likely value for the TTL test is 40 (hex) which is the correct value is over 200 of the 417 signature database entries.

As mentioned above, information gain tends to overestimate the quality of tests that have many possible values. When studying fingerprinting tests with a similar number of values this is not an issue. However, the fingerprinting tests in Nmap range from having two values to having tens or hundreds of values. FIGS. 8A, 8B, and 9A-9C look more closely at the distribution of values for highly discriminative and discriminative tests. The number of values and their distribution vary greatly for each of these tests. While OPS and WIN have a large number of values, their distributions make it clear that these are very valuable tests in terms of narrowing down the operating system classification of a target system. Based on the number of values alone, ISN would be the highest quality test, but it is clear that the information gain calculation herein is not mislead into ranking ISN above OPS and WIN. Similarly, although TTL and TS have fewer values than OPS and WIN, they show distributions that are skewed toward a few uninformative test values. Note that the ISN test is based largely on predicting the value produced by a random number generator. Information gain is useful in differentiating target systems that do not use fully random ISN generation, but it may not be as useful a measure in discriminating the remaining systems.

While these results indicate that information gain is a valuable measurement in evaluating fingerprinting tests, the existence of bias should temper relying too heavily, on specific values of information gain. The qualitative grouping of tests into 50%, 25%, and 10% groups of highly discriminative, discriminative, and less discriminative tests captures the quality of the tests.

Regarding ranking tests by information gain within families of systems, as mentioned above, operating system fingerprinting may require a sequence of tests in order to sufficiently narrow down the possible operating system classifications before making a guess at the target system classification. In one scenario, the possible classifications have been narrowed down to a family of operating systems (using fingerprinting tests or based on other knowledge), and it is desirable to determine the version of the operating system within this family. For example, it may be known that the target system is a Linux system, but not which version of Linux.

The table in FIG. 7 helps in evaluating which fingerprinting tests are most useful in narrowing down the classification of a target system from within the Microsoft Windows®, Linux, or embedded device families of systems. These ranking are achieved by reducing the Nmap signature database to a subset of entries identified as belonging to a specific family of systems. It is interesting to note that the highly discriminative tests OPS and WIN are still the top two tests in differentiating systems within a family. However, there are interesting differences. While OPS is the top overall test and the top test in differentiating Linux versions, WIN is the top test in differentiating Window versions and the version of embedded systems. If it is already known that a target system is in the Microsoft Windows family, OPS is no longer a highly discriminative test. Similarly, if it is already known that a target system is in the Linux family, WIN is no longer a highly discriminative test.

While ISN, TTL and TS remain among the most discriminative tests in each family, their quality varies across families. For example, TTL is less discriminative in differentiating Windows versions or Linux versions and more discriminative overall or within the family of embedded systems. ISN is not very discriminative among Linux versions. Also note that the probe that achieves the highest information gain for each type of test varies across families. For example, the T3 probe is more useful in differentiating Linux versions than it is in general. This is discussed further below. It is important to recall that the results in FIG. 7 make no assumptions about the distribution of versions within a family of systems. If available, this information can be used to better refine the information gain measure.

Regarding the variability of tests across probes, in FIG. 7 only the maximum information gain of each type of test is recorded. Here, the variability over information gain for the same test over differing probes is now discussed. Over all signature entries, the WIN and OPS tests on responses to the second SEQ probe have the highest information gain. However, the tests are still highly discriminative (removing greater than 50% of the uncertainty) when applied to any of the SEQ probes, the ECN probe, or the T3 probes. On the other hand, the OPS test provides no information gain when applied to probe responses T2 and T4-T7, while the WIN test is less discriminative (removing greater than 10% of the uncertainty) when applied to probe responses T4 and T2, and not discriminative when applied to probe responses T5-T7. The TTL test is discriminative (removing greater than 25% of the uncertainty) over all probes except T2, which is slightly less discriminative. The ISN tests SP and ISR are both discriminative, while the GCD test is less discriminative. Looking at a different type of test, the test of the "don't fragment" bit (DF) is less discriminative over all probes, except the UDP probe for which it is not discriminative.

Over signature entries for Microsoft Windows systems, the WIN test is highly discriminative over all the SEQ probes as well as the ECN and T3 probes. The WIN test is not discriminative over T2 or T4-T7. The OPS test is discriminative over all the SEQ probes as well as the ECN and T3 probes. The OPS test provides no information gain when applied to probe responses T2 and T4-T7. The TTL test is less discriminative over all probes except T3, for which it is not discriminative.

The ISN tests SP and ISR are both discriminative, while the GCD test is not discriminative. The DF test only provides discrimination over probes T1 and T4.

Over signature entries for Linux systems, the OPS test is highly discriminative over all SEQ tests except probe 6, as well as the T3 and ECN probes. SEQ probe 6 is discriminative, while probes T2 and T4-T7 provide no information gain. The WIN test is discriminative over all the SEQ probes as well as the ECN and T3 probes. The WIN test is not discriminative over T2 and T4-T7. The TTL test is less discriminative over all probes except T2, for which there is no information gain. All ISN and DF tests are not discriminative for Linux systems.

Over signature entries for routers, firewalls, and switches, the WIN test is highly discriminative over all the SEQ probes as well as the ECN and T3 probes. The WIN test over the T4 probe is discriminative, while the test over the T2, T4, and T6-T7 probes are less discriminative and the T5 probe is not discriminative. The OPS test is highly discriminative (or close) for all the SEQ probes except probe 6, and discriminative for the ECN, T3 probes and probe 6. The OPS test is not discriminative over probes T2, and T4-T7. The TTL and ISN tests are discriminative over all probes. The DF test is less discriminative over all probes except T5 and UDP, for which it is not discriminative.

These results can be summarized by observing that SEQ probes and the ECN and T3 probes provide the most discriminative tests over all families. The selection of which probes to include in the design of an operating system fingerprinting tool can be based on other factors, such as the robustness of each probe to defensive devices, as described below. ISN testing is not useful for differentiating Linux systems, so only a subset of the SEQ probes need be considered there. Probes T2 and T4-T7 are rarely discriminative and their general use should be questioned. It is interesting to note that these tests make up the majority of the first generation version of Nmap operating system detection. However, their value seems to have been superseded by similar tests performed by the SEQ probes. The analysis herein of this version of Nmap backs up this conclusion by revealing that probes T1 and T3 are the most discriminative. Probe T1 is similar to SEQ probe 1 in the second generation Nmap and T3 is the same as T3. It is also observed that OPS is more discriminative in the second generation than it is in the first. This may be due to the inclusion of the SACK and window scale value options in the second generation tests. Finally, except for the TTL test, tests associated with UDP and ICMP probes are of marginal value. These probes can be avoided by guessing the TTL from TCP probes.

Regarding OS fingerprinting in practice, fingerprinting tests have been ranked herein in terms of their information gain. In theory, the highest ranked tests remove the most uncertainty from the problem of guessing the operating system classification of a target system. However, that assumes that the probes that are used in each test reach the target system and the responses from the target system reach the client, without being modified or blocked by intermediate defensive devices, such as firewalls or network scrubbers. The signature databases used in open source tools are created under controlled conditions that may not be replicable in practice.

Others have studied the problem of defeating TCP/IP fingerprinting and found that certain probes and responses used in fingerprinting tests could be modified or blocked without affecting TCP/IP performance. For example, a network scrubber was developed to implement some of these methods, e.g., normalizing TCP options. Still others have proposed normalizing TCP traffic to remove ambiguities for use in network intrusion detection. Normalizing TCP options would render the options fingerprinting test much less useful. However, it has been empirically demonstrated that defensive devices like the PF network filter, despite having traffic normalizing features, are not commonly configured to defeat operating system fingerprinting.

Probes that begin with TCP SYN to an open port are less likely to be blocked, while many ICMP packets are commonly blocked by default. ICMP may further cause alerts by intrusion detection systems. While normalizing TCP options can be implemented without affecting performance, the benefits of defeating operating system fingerprinting by normalizing the initial window size may not be worth the performance trade-offs. Open source tools can be adapted to emphasize tests that are more effective in practice. For example, Nmap's second generation operating system detection includes a set of tunable parameters called "MatchPoints" that allow the user to heuristically weigh tests that are more effective and reliable in practice.

Since certain changes may be made in the above-described method and system for evaluating fingerprinting tests used in operating system fingerprinting, without departing from the spirit and scope of the invention herein involved, it is intended that all of the subject matter of the above description or shown in the accompanying drawings shall be interpreted merely as examples illustrating the inventive concept herein and shall not be construed as limiting the invention.

We claim:

1. A method of evaluating a classification system, the method comprising:
determining an information gain profile of a signature database, the signature database being associated with the classification system; and
evaluating the classification system based on the information gain profile;
wherein the information gain profile includes at least one information gain value for each of a plurality of classification tests of the classification system that quantify the benefit of using each of the plurality of classification tests to classify a target system, and at least one information gain value of a classification test is determined using conditional entropy.

2. The method of claim 1 wherein:
the signature database comprises data associated with the application of the plurality of classification tests to a plurality of known systems; and
the information gain profile comprises at least one of the at least one information gain value for each of the plurality of classification tests.

3. The method of claim 2 wherein:
the classification system is evaluated by ranking the at least one information gain value of the plurality of classification tests; and
the method further comprises:
executing a first subset of the plurality of classification tests for classifying at least one of the target systems; and
omitting a second, remaining subset of the plurality of classification tests, wherein the distribution of the plurality of classification tests between the first and second subsets is based on the ranking.

4. The method of claim 3 further comprising:
determining a discriminative value of each of the plurality of classification tests in identifying between different known systems, based at least in part on the at least one information gain value of the plurality of classification tests;

wherein the classification system is evaluated based on the discriminative values of the plurality of classification tests.

5. The method of claim 3 further comprising:

ranking the at least one information gain value of the plurality of classification tests with respect to (i) all known systems of the signature database and (ii) known systems of the signature database within selected family groupings of the known systems.

6. The method of claim 2 wherein:

a first subset of the plurality of classification tests each have null data values, disjunctive data values, and/or ranges of data values associated therewith in the signature database; and the at least one information gain value for the plurality of classification tests in the first subset are generated in part based on the null data values, disjunctive data values, and/or ranges of data values.

7. The method of claim 1 wherein:

the classification system is a software tool configured for classifying the target system; and the target system is software.

8. The method of claim 7 wherein:

the software tool is an operating system (OS) fingerprinting tool; and the target system is an unknown operating system, wherein the OS fingerprinting tool is configured for use in identifying the unknown operating system.

9. The method of claim 8 wherein:

the OS fingerprinting tool includes the plurality of classification tests for classifying the unknown operating system;

the signature database comprises data associated with the application of the plurality of classification tests to a plurality of known operating systems; and the information gain profile comprises the at least one information gain value for each of the plurality of classification tests.

10. The method of claim 9 wherein:

the OS fingerprinting tool is evaluated by ranking the at least one information gain value of the plurality of classification tests; and the method further comprises:

executing a first subset of the plurality of classification tests for classifying at least one of the unknown operating systems, the first subset being executed in an order based on a decision tree analysis of the plurality of classification tests; and omitting a second, remaining subset of the plurality of classification tests, wherein the first and second subsets are based on the ranking.

11. The method of claim 9 wherein:

a first subset of the plurality of classification tests each have null data values, disjunctive data values, and/or ranges of data values associated therewith in the signature database; and the at least one information gain value for the plurality of classification tests in the first subset are generated in part based on the null data values, disjunctive data values, and/or ranges of data values.

12. A method of evaluating a classification system, the method comprising:

determining at least one information gain value for each of a plurality of classification tests, the plurality of classification tests being associated with the classification system; and evaluating the classification system based on the at least one information gain value for each of the plurality of classification tests;

wherein the at least one information gain value quantifies the benefit of using the plurality of classification tests to classify a target system;

wherein the at least one information gain value is determined based on a signature database of the classification system, the signature database including data relating to the application of the plurality of classification tests to known systems, and the at least one information gain value is determined using conditional entropy.

13. The method of claim 12 wherein:

the classification system is configured for use in classifying the target system;

the classification system is evaluated by ranking the at least one information gain value of the plurality of classification tests; and the method further comprises:

executing a first subset of the plurality of classification tests for classifying the target system; and omitting a second, remaining subset of the plurality of classification test, wherein the distribution of the plurality of classification tests between the first and second subsets is based on the ranking.

14. The method of claim 13 wherein the plurality of classification tests in the first subset are executed in an order based on a decision tree analysis of the plurality of classification tests and/or the at least one information gain value thereof.

15. The method of claim 12 wherein:

a first subset of the plurality of classification tests each have null data values, disjunctive data values, and/or ranges of data values associated therewith in the signature database; and the at least one information gain value for the plurality of classification tests in the first subset are generated in part based on the null data values, disjunctive data values, and/or ranges of data values.

16. The method of claim 12 wherein:

the classification system is an operating system (OS) fingerprinting tool configured for use in identifying unknown operating systems; and the known systems are known operating systems.

17. The method of claim 16 wherein:

the operating system (OS) fingerprinting tool is evaluated by ranking the at least one information gain value of the plurality of classification tests; and the method further comprises:

executing a first subset of the plurality of classification tests for classifying at least one of the unknown operating systems, the plurality of classification tests in the first subset being executed in an order based on a decision tree analysis of the plurality of classification tests and/or at least one information gain value thereof; and omitting a second, remaining subset of the plurality of classification tests, wherein the distribution of the plurality of classification tests between the first and second subsets is based on the ranking.

18. The method of claim 16 wherein:
a first subset of the plurality of classification tests each have null data values, disjunctive data values, and/or ranges of data values associated therewith in the signature database; and
the at least one information gain value for the plurality of classification tests in the first subset are generated at least in part based on the null data values, disjunctive data values, and/or ranges of data values.

19. A method for evaluating an operating system (OS) fingerprinting tool, the method comprising:
determining at least one information gain value for each of a plurality of classification tests, the plurality of classification tests being associated with the OS fingerprinting tool for use in classifying target operating systems; and
evaluating the OS fingerprinting tool based on the at least one information gain value;
wherein the at least one information gain value quantifies the benefit of using at least one of the plurality of classification tests in classifying the target operating systems;
wherein the at least one information gain value is determined based on a signature database of the OS fingerprinting tool, the signature database including data relating to the application of the plurality of classification tests to known operating systems, and is further determined using conditional entropy.

20. The method of claim 19 wherein:
the data in the signature database includes null data values, disjunctive data values, and/or ranges of data values; and
the at least one information gain value is generated at least in part based on the null data values, disjunctive data values, and/or ranges of data values.

* * * * *